(12) United States Patent
Hubley et al.

(10) Patent No.: US 9,909,437 B2
(45) Date of Patent: Mar. 6, 2018

(54) CURVIC SEAL FOR USE IN A GAS TURBINE ENGINE AND METHOD OF ASSEMBLING A GAS TURBINE ENGINE

(71) Applicant: General Electric Company, Schenectady, NY (US)

(72) Inventors: Christopher Karl Hubley, Cincinnati, OH (US); Khalil Qader, West Chester, OH (US); Sang Yeng Park, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/959,104

(22) Filed: Dec. 4, 2015

(65) Prior Publication Data
US 2017/0159469 A1 Jun. 8, 2017

(51) Int. Cl.
| | |
|---|---|
| F01D 5/06 | (2006.01) |
| F01D 5/02 | (2006.01) |
| F01D 11/00 | (2006.01) |
| F16J 15/06 | (2006.01) |
| F16J 15/08 | (2006.01) |

(52) U.S. Cl.
CPC ............ *F01D 11/003* (2013.01); *F01D 5/026* (2013.01); *F01D 11/005* (2013.01); *F16J 15/067* (2013.01); *F16J 15/0887* (2013.01); *F05D 2220/30* (2013.01); *F05D 2240/55* (2013.01)

(58) Field of Classification Search
CPC . F16J 15/02; F16J 15/06; F16J 15/067; F01D 11/003; F01D 11/005; F05D 2240/58
See application file for complete search history.

(56) References Cited

U.S. PATENT DOCUMENTS

| | | | |
|---|---|---|---|
| 1,151,112 A | 8/1915 | Magarrell | |
| 1,447,533 A | 3/1923 | Chopieska | |
| 1,479,089 A | 1/1924 | Short | |
| 3,656,784 A * | 4/1972 | Dow | F16L 17/02 285/187 |
| 4,602,795 A | 7/1986 | Lillibridge | |
| 5,628,621 A * | 5/1997 | Toborg | F01D 5/066 416/198 A |
| 5,632,600 A * | 5/1997 | Hull | F01D 5/06 416/198 A |

(Continued)

FOREIGN PATENT DOCUMENTS

| | | |
|---|---|---|
| DE | 102008049195 A1 | 6/2010 |
| GB | 2134604 A | 8/1984 |

(Continued)

OTHER PUBLICATIONS

A European Search Report And Opinion issued in connection with corresponding EP Application No. 16200564.9 dated May 15, 2017.

*Primary Examiner* — Gilbert Y Lee
(74) *Attorney, Agent, or Firm* — General Electric Company; William Scott Andes

(57) ABSTRACT

A curvic seal for use in a gas turbine engine is provided. The curvic seal includes a split ring including a first slit extending therethrough, and a biasing ring coupled to the split ring and extending along a radially inner side thereof. The biasing ring is configured to bias against the split ring and restrict airflow through the first slit.

17 Claims, 5 Drawing Sheets

(56) References Cited

U.S. PATENT DOCUMENTS

| | | | | |
|---|---|---|---|---|
| 2004/0007830 A1* | 1/2004 | Uematsu | ............ | F01D 5/066 277/628 |
| 2004/0245778 A1* | 12/2004 | Adams | ............ | F16L 37/088 285/340 |
| 2010/0072710 A1 | 3/2010 | Morgan et al. | | |
| 2012/0201658 A1* | 8/2012 | Le Brusq | ............ | F01D 5/025 415/123 |
| 2012/0261887 A1* | 10/2012 | Vasagar | ............ | F01D 11/003 277/543 |
| 2016/0010458 A1* | 1/2016 | Virkler | ............ | F01D 5/026 416/120 |

FOREIGN PATENT DOCUMENTS

| | | | | |
|---|---|---|---|---|
| GB | 2252143 A * | 7/1992 | ............ | F02F 1/183 |
| WO | 2014197024 A2 | 12/2014 | | |
| WO | 2014197074 A2 | 12/2014 | | |

* cited by examiner

CURVIC SEAL FOR USE IN A GAS TURBINE ENGINE AND METHOD OF ASSEMBLING A GAS TURBINE ENGINE

BACKGROUND

The present disclosure relates generally to sealing mechanisms and, more specifically, to sealing mechanisms for curvic joints in a turbofan engine.

At least some known gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a second drive shaft. The low-pressure turbine rotatably drives the fan through the second drive shaft.

Many modern commercial gas turbine engines include one or more axial couplings, which transmit torque between rotating components. Curvic couplings and Hirth couplings are types of precision face splines which are commonly used for this purpose. These types of joints include radial spline teeth formed in the end faces of the rotating components. The end faces of rotating components are coupled together such that the radial spline teeth from a first rotating component engage the radial spline teeth from a second rotating component, and torque is transmitted therebetween through the radial spline teeth. In at least some known turbofan engines, a high-temperature plenum and a low-temperature plenum are defined on opposing sides of the curvic coupling. A flow of air channeled through the low-temperature plenum is typically used for cooling components within the turbofan engine. However, leakage through the curvic coupling facilitates reducing the cooling efficiency of the flow of air channeled through the low-temperature plenum.

BRIEF DESCRIPTION

In one aspect, a curvic seal for use in a gas turbine engine is provided. The curvic seal includes a split ring including a first slit extending therethrough, and a biasing ring coupled to the split ring and extending along a radially inner side thereof. The biasing ring is configured to bias against the split ring and restrict airflow through the first slit.

In another aspect, a gas turbine engine is provided. The gas turbine engine includes a curvic coupling positioned between a first rotating component and a second rotating component of the turbofan engine, and a curvic seal positioned radially inward from the curvic coupling. The curvic seal includes a split ring including a first slit extending therethrough, and a biasing ring coupled to the split ring and extending along a radially inner side thereof. The biasing ring is configured to bias against the split ring and restrict airflow through the first slit.

In yet another aspect, a method of assembling a curvic seal for use in a gas turbine engine is provided. The method includes defining a radially inner side of a split ring having a first slit extending therethrough, and coupling a biasing ring to the split ring such that the biasing ring extends along the radially inner side of the split ring. The biasing ring is configured to bias against the split ring and restrict airflow through the first slit.

DRAWINGS

These and other features, aspects, and advantages of the present disclosure will become better understood when the following detailed description is read with reference to the accompanying drawings in which like characters represent like parts throughout the drawings, wherein.

Figure 1:
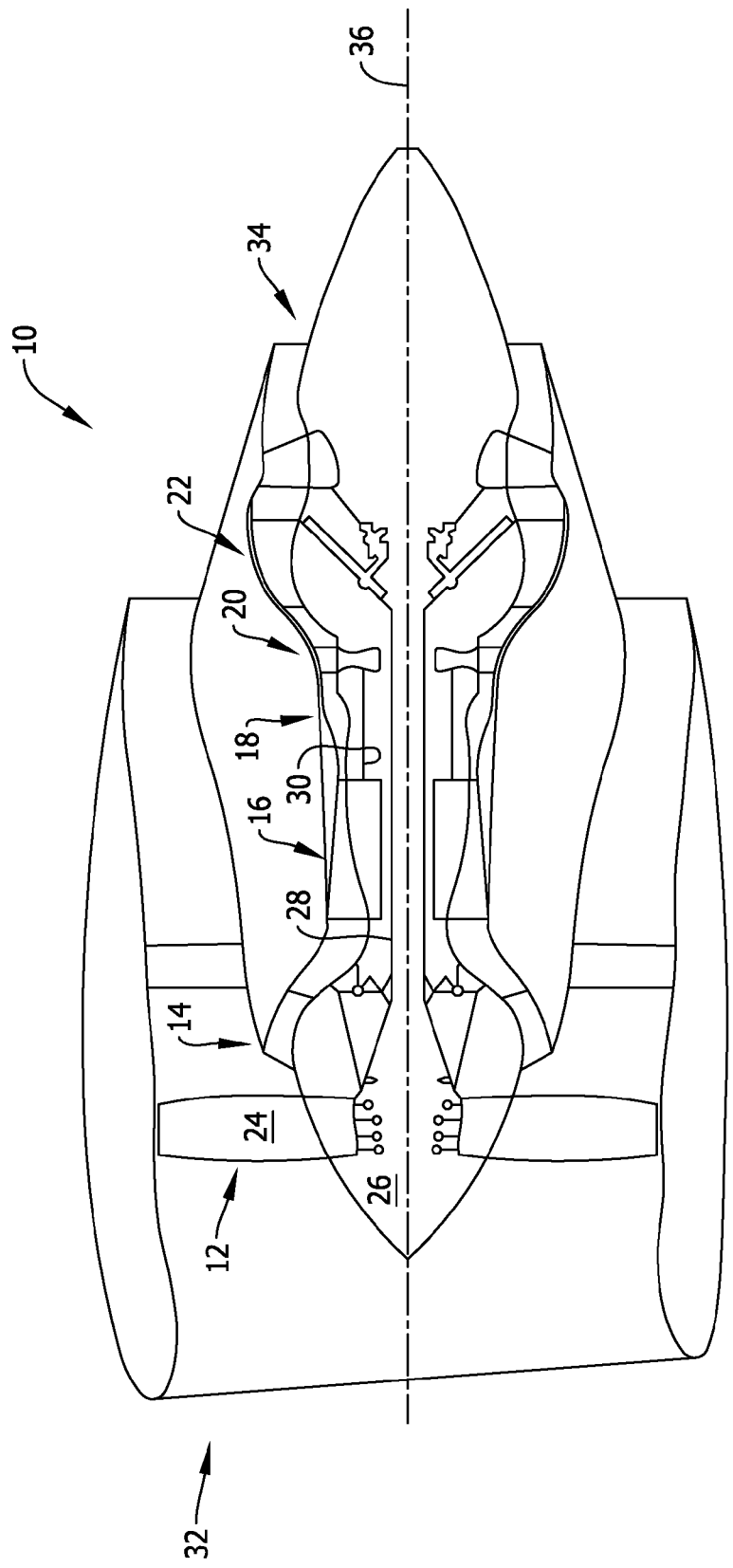
FIG. 1 is a schematic illustration of an exemplary turbofan engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to turbine engines, such as turbofans, and methods of assembling thereof. More specifically, the turbine engines described herein include a curvic coupling positioned between rotating components and a curvic seal positioned radially inward from the curvic coupling. The curvic seal is a two-piece seal including a split ring and a biasing ring coupled to the split ring. The split ring is radially flexible and includes a slit extending therethrough, which enables the split ring to account for manufacturing variances and differences in thermal expansion across the curvic coupling. The biasing ring interlocks with the split ring such that the biasing ring remains substantially stationary relative to the split ring as it rotates during operation of the turbine engine. Moreover, centrifugal force generated by rotation of components in the turbine engine cause the biasing ring to bias against the split ring to restrict airflow through the slit in the split ring. As such, radial seal leakage through the curvic coupling is reduced by at least 50 percent in some instances. Moreover, the two-piece seal is less sensitive to manufacturing tolerances when compared to traditional single-piece split ring curvic seals.

FIG. 1 is a schematic illustration of an exemplary turbofan engine 10 including a fan assembly 12, a low pressure or booster compressor 14, a high-pressure compressor 16, and a combustor assembly 18. Fan assembly 12, booster compressor 14, high-pressure compressor 16, and combustor assembly 18 are coupled in flow communication. Turbofan engine 10 also includes a high-pressure turbine 20 coupled in flow communication with combustor assembly 18 and a low-pressure turbine 22. Fan assembly 12 includes an array of fan blades 24 extending radially outward from a rotor disk 26. Low-pressure turbine 22 is coupled to fan assembly 12 and booster compressor 14 through a first drive shaft 28, and high-pressure turbine 20 is coupled to high-pressure compressor 16 through a second drive shaft 30. Turbofan engine 10 has an intake 32 and an exhaust 34. Turbofan engine 10 further includes a centerline 36 about which fan assembly 12, booster compressor 14, high-pressure compressor 16, and turbine assemblies 20 and 22 rotate.

In operation, air entering turbofan engine 10 through intake 32 is channeled through fan assembly 12 towards booster compressor 14. Compressed air is discharged from booster compressor 14 towards high-pressure compressor 16. Highly compressed air is channeled from high-pressure compressor 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbofan engine 10 via exhaust 34.

Figure 2:
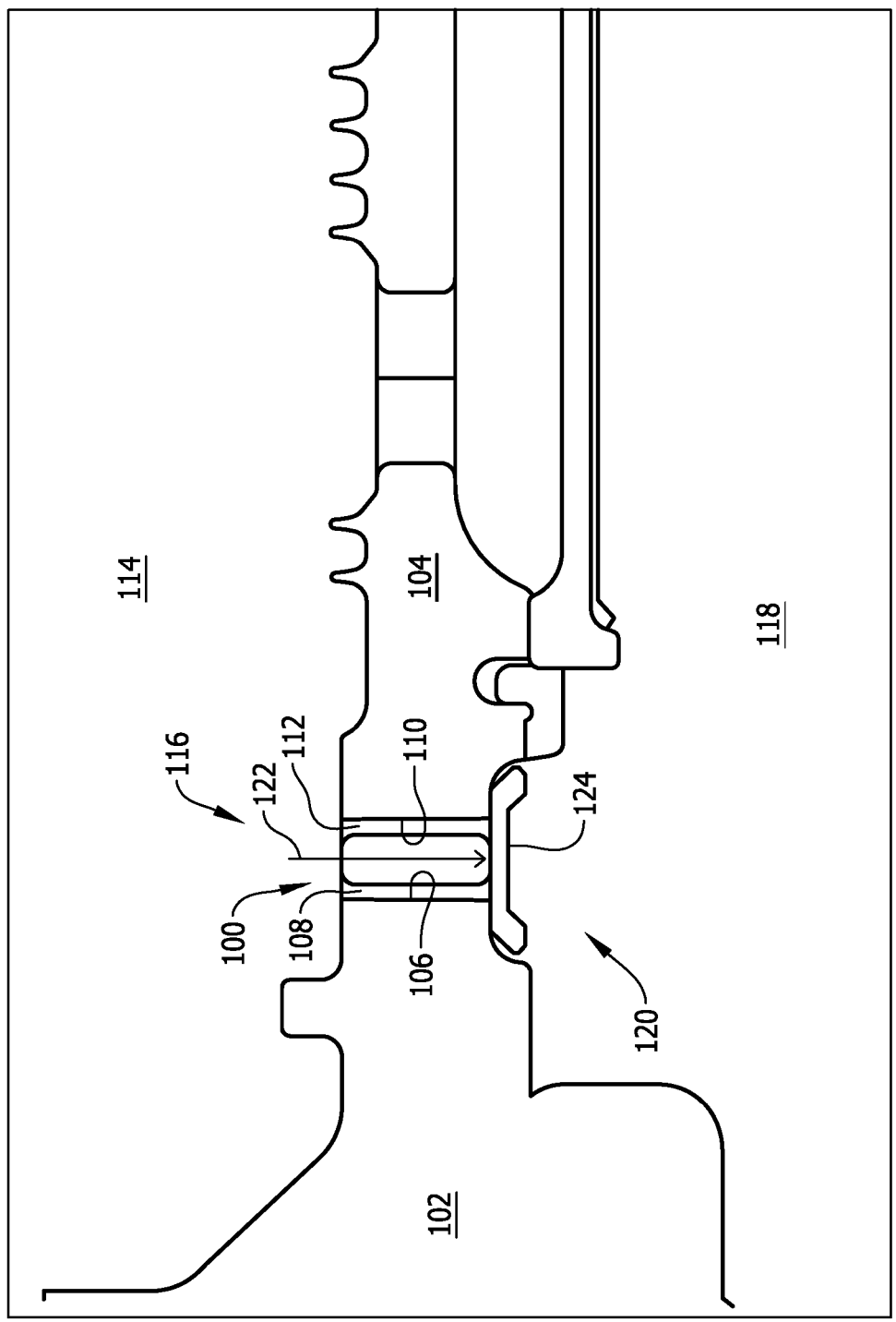
FIG. 2 is a cross-sectional view of an exemplary portion of the turbofan engine shown in FIG. 1.

FIG. 2 is a cross-sectional view of an exemplary portion of turbofan engine 10 (shown in FIG. 1). In the exemplary embodiment, turbofan engine 10 includes a curvic coupling 100 positioned between a first rotating component 102 and a second rotating component 104 of turbofan engine 10. More specifically, first rotating component 102 includes a first end face 106 and radial seal teeth 108 extending from first end face 106, and second rotating component 104 includes a second end face 110 and radial seal teeth 112 extending from second end face 110. First rotating component 102 and second rotating component 104 are coupled together such that radial seal teeth 108 and radial seal teeth 112 engage each other, thereby defining curvic coupling 100. As such, a high-pressure plenum 114 is defined on a radially outer side 116 of curvic coupling 100, and a low-pressure plenum 118 is defined on a radially inner side 120 of curvic coupling 100.

In operation, a differential pressure defined across curvic coupling 100 causes a flow of air 122 to leak through curvic coupling 100 from high-pressure plenum 114 towards low-pressure plenum 118. More specifically, gaps (not shown) defined between adjacent radial seal teeth 108 and 112, between radial seal teeth 108 and second end face 110, and between radial seal teeth 112 and first end face 106 allow the flow of air 122 to be channeled from high-pressure plenum 114 towards low-pressure plenum 118. As will be described in more detail below, in the exemplary embodiment, a curvic seal 124 is positioned radially inward from curvic coupling 100 to restrict airflow through curvic coupling 100.

Figure 3:
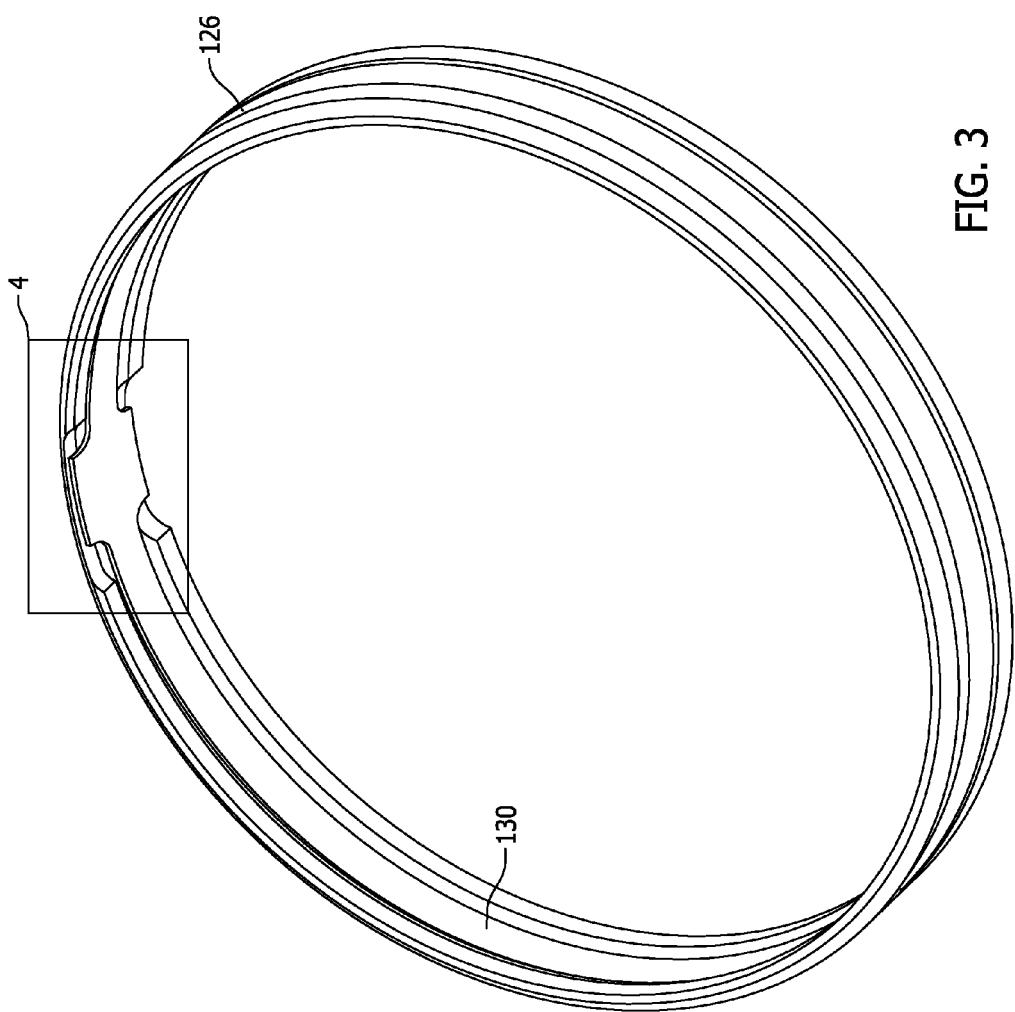
FIG. 3 is a perspective view of an exemplary curvic seal that may be used in the turbofan engine shown in FIG. 1.
Figure 4:
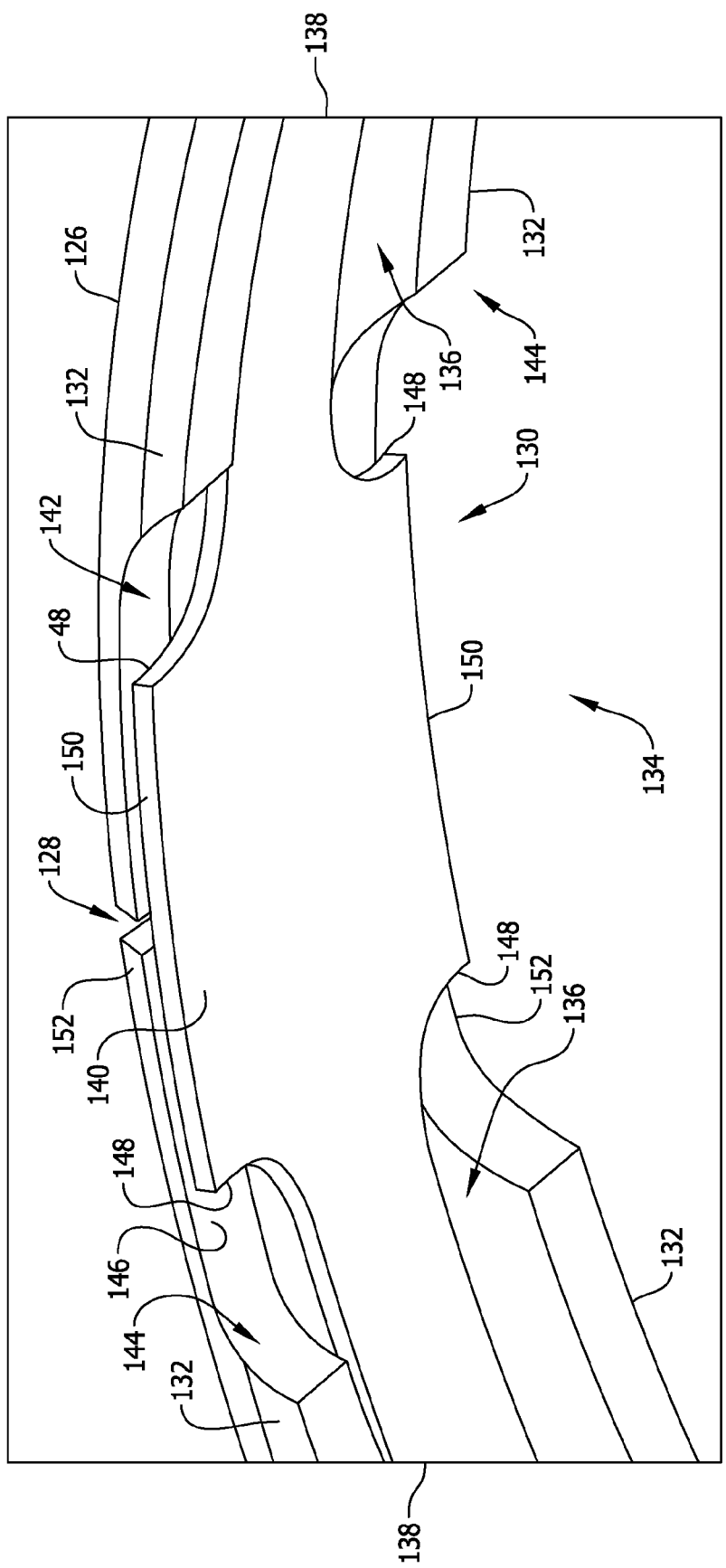
FIG. 4 is an enlarged perspective view of the curvic seal shown in FIG. 3 taken along Area 4.

FIG. 3 is a perspective view of an exemplary curvic seal 124 that may be used in turbofan engine 10 (shown in FIG. 1), and FIG. 4 is an enlarged perspective view of curvic seal 124 taken along Area 4. In the exemplary embodiment, curvic seal 124 includes a split ring 126 including a first slit 128 extending therethrough. First slit 128 is defined in split ring 126 to enable split ring 126 to be dimensionally flexible during operation of turbofan engine 10. First slit 128 also allows the flow of air 122 (shown in FIG. 2) to be channeled therethrough. In the exemplary embodiment, curvic seal 124 also includes a biasing ring 130 coupled to split ring 126 and extending along a radially inner side thereof. At least a portion of biasing ring 130 interlocks with split ring 126 such that biasing ring 130 remains substantially stationary relative to split ring 126 as it rotates during operation of turbofan engine 10. As used herein, "substantially stationary" refers to the capability of biasing ring 130 to move relative to split ring 126 without freely rotating therein. In an alternative embodiment, biasing ring 130 is securely coupled to split ring 126 through brazing or another suitable coupling mechanism. In operation, centrifugal force generated by rotation of components within turbofan engine 10 cause biasing ring 130 to bias against split ring 126 such that biasing ring 130 restricts airflow through first slit 128.

Referring to FIG. 4, split ring 126 includes a pair of side walls 132 extending circumferentially on radially inner side 134 of split ring 126. A receiving channel 136 extends between the pair of side walls 132, and biasing ring 130 extends circumferentially within receiving channel 136. More specifically, biasing ring 130 includes a first portion 138 that extends circumferentially within receiving channel 136, and a second portion 140 that extends across first slit 128 in split ring 126 such that second portion 140 restricts airflow therethrough. As such, side walls 132 restrict axial movement of biasing ring 130, and biasing ring 130 is retained within receiving channel 136 either by a spring force induced from biasing ring 130 or by the centrifugal force generated during operation of turbofan engine 10.

In the exemplary embodiment, the pair of side walls 132 include opposing ends 144 separated from each other such that an axial slot 142 is defined between the pair of side walls 132 in split ring 126. Put another way, axial slot 142 is defined on the radially inner side of split ring 126 in an area that does not include the pair of side walls 132. Opposing ends 144 of the pair of side walls 132 are positioned on opposing sides of first slit 128, and axial slot 142 is sized to receive second portion 140 of biasing ring 130 therein. As such, axial slot 142 is sized to enable second portion 140 to bias directly against a radially inner surface 146 of split ring 126 to facilitate sealing first slit 128.

Moreover, second portion 140 is undersized relative to axial slot 142 in a circumferential direction. More specifically, second portion 140 includes end edges 148, and second portion 140 is sized such that end edges 148 are spaced from both opposing ends 144 of the pair of side walls 132. As such, second portion 140 is not constrained within axial slot 142, which enables second portion 140 to remain biased directly against radially inner surface 146 of split ring 126 even when the dimensions of split ring 126 fluctuate during operation of turbofan engine 10.

In the exemplary embodiment, second portion 140 of biasing ring 130 has a greater width than first portion 138 to facilitate restricting airflow through first slit 128. For example, second portion 140 has a width such that side edges 150 of second portion 140 substantially align with side edges 152 of split ring 126. As such, an axial length (i.e., the width) of second portion 140 is sized to completely cover first slit 128 in an axial direction relative to centerline 36 (shown in FIG. 1). In an alternative embodiment, second portion 140 has a width that is either greater than or less than the width of split ring 126.

Figure 5:
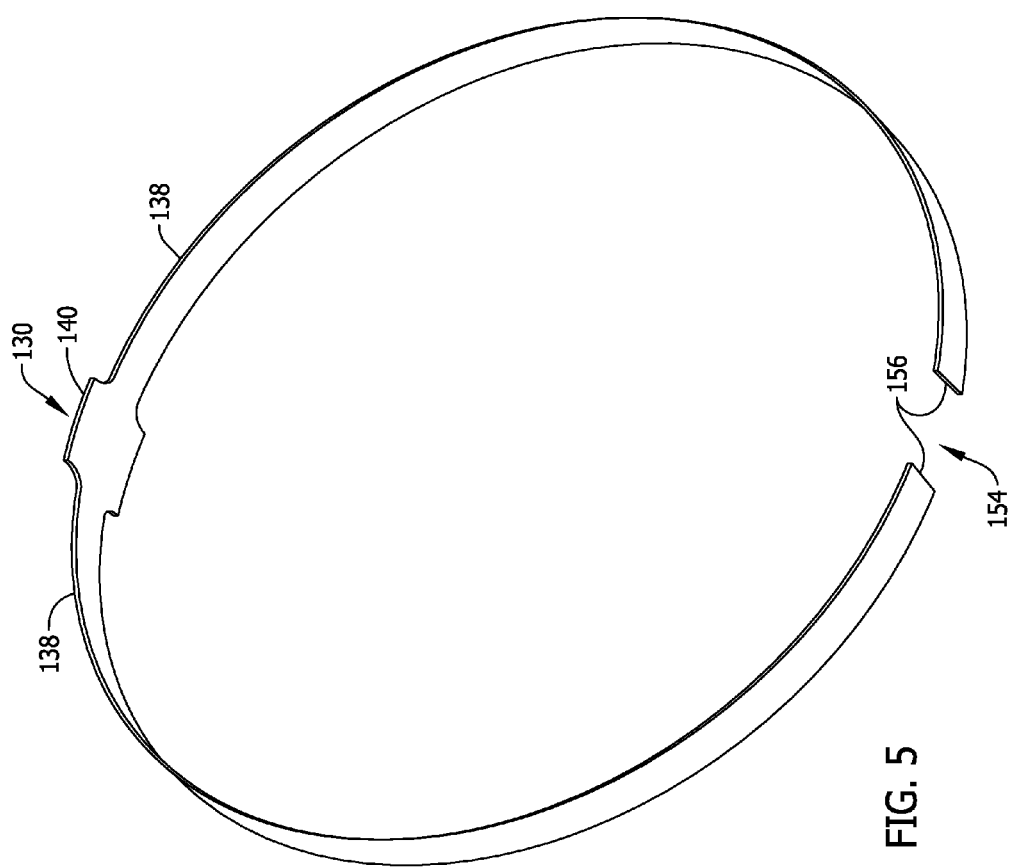
FIG. 5 is a perspective view of an exemplary biasing ring that may be used in the curvic seal shown in FIG. 3.

FIG. 5 is a perspective view of biasing ring 130 that may be used in curvic seal 124 (shown in FIG. 3). In the exemplary embodiment, biasing ring 130 includes a second slit 154 extending therethrough, and defined between opposing free ends 156 of biasing ring 130. Second slit 154 is defined in biasing ring 130 to enable biasing ring 130 to be dimensionally flexible during operation of turbofan engine 10 (shown in FIG. 1). Moreover, second slit 154 is circumferentially offset from first slit 128 when biasing ring 130 is coupled to split ring 126. As such, second slit 154 is positioned such that first and second slits 128 and 154 are misaligned and incapable allowing airflow to be channeled therethrough.

An exemplary technical effect of the system and methods described herein includes at least one of: (a) reducing airflow leakage through a curvic coupling; (b) enabling more relaxed tolerances on the curvic seal and a mating component when compared to traditional one-piece split rings; and (c) improving the cooling efficiency of a flow of air channeled through the turbofan engine.

Exemplary embodiments of a turbofan engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan engines and related methods as described herein. Rather, the exemplary embodiment can be implemented and utilized in connection with many applications where reducing leakage through an annular seal is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A curvic seal for use in a gas turbine engine, said curvic seal comprising:
    a split ring comprising a first slit extending therethrough; and
    a biasing ring coupled to said split ring and extending along a radially inner side thereof, said biasing ring configured to bias against said split ring and restrict airflow through said first slit; wherein said split ring comprises:
    a pair of side walls extending circumferentially on the radially inner side of said split ring; and
    a receiving channel extending between said pair of side walls, wherein said biasing ring extends circumferentially within said receiving channel.

2. The curvic seal in accordance with claim 1, wherein said biasing ring comprises:
    a first portion extending circumferentially within said receiving channel; and
    a second portion extending across said first slit and restricting airflow through said first slit.

3. The curvic seal in accordance with claim 2, wherein said second portion has a width such that side edges of said second portion substantially align with side edges of said split ring.

4. The curvic seal in accordance with claim 2, wherein said pair of side walls comprise opposing ends separated from each other such that an axial slot is defined therebetween, said opposing ends of said pair of side walls positioned on opposing sides of said first slit.

5. The curvic seal in accordance with claim 4, wherein said axial slot is sized to receive said second portion therein, said second portion undersized relative to said axial slot in a circumferential direction.

6. A curvic seal for use in a gas turbine engine, said curvic seal comprising:
    a split ring comprising a first slit extending therethrough; and
    a biasing ring coupled to said split ring and extending along a radially inner side thereof, said biasing ring configured to bias against said split ring and restrict airflow through said first slit; wherein said biasing ring comprises a second slit extending therethrough, said second slit offset from said first slit when said biasing ring is coupled to said split ring.

7. A gas turbine engine comprising:
    a curvic coupling positioned between a first rotating component and a second rotating component of the gas turbine engine; and
    a curvic seal positioned radially inward from said curvic coupling, said curvic seal comprising:
    a split ring comprising a first slit extending therethrough; and
    a biasing ring coupled to said split ring and extending along a radially inner side thereof, said biasing ring configured to bias against said split ring and restrict airflow through said first slit; wherein said split ring comprises:
    a pair of side walls extending circumferentially on the radially inner side of said split ring; and
    a receiving channel extending between said pair of side walls, wherein said biasing ring extends circumferentially within said receiving channel.

8. The gas turbine engine in accordance with claim 7, wherein said biasing ring comprises:

a first portion extending circumferentially within said receiving channel; and a second portion extending across said first slit and restricting airflow through said first slit.

9. The gas turbine engine in accordance with claim 8, wherein said second portion has a width such that side edges of said second portion substantially align with side edges of said split ring.

10. The gas turbine engine in accordance with claim 9, wherein said pair of side walls comprise opposing ends separated from each other such that an axial slot is defined therebetween, said opposing ends of said pair of side walls positioned on opposing sides of said first slit.

11. The gas turbine engine in accordance with claim 10, wherein said axial slot is sized to receive said second portion therein, said second portion undersized relative to said axial slot in a circumferential direction.

12. The gas turbine engine in accordance with claim 11, wherein said biasing ring comprises a second slit extending therethrough, said second slit offset from said first slit when said biasing ring is coupled to said split ring.

13. A method of assembling a curvic seal for use in a gas turbine engine, said method comprising:

defining a radially inner side of a split ring having a first slit extending therethrough; and coupling a biasing ring to the split ring such that the biasing ring extends along the radially inner side of the split ring, the biasing ring configured to bias against the split ring and restrict airflow through the first slit; wherein coupling a biasing ring comprises extending the biasing ring circumferentially within a receiving channel defined between a pair of side walls that extend circumferentially on the radially inner side of the split ring.

14. The method in accordance with claim 13, wherein coupling a biasing ring comprises:

extending a first portion of the biasing ring circumferentially within the receiving channel; and configuring a second portion of the biasing ring to extend across the first slit and restrict airflow therethrough.

15. The method in accordance with claim 14, wherein coupling a biasing ring comprises substantially aligning side edges of the second portion with side edges of the split ring.

16. The method in accordance with claim 14 further comprising defining an axial slot between opposing ends of the pair of side walls, the axial slot sized to receive the second portion of the biasing ring therein.

17. The method in accordance with claim 16 further comprising sizing the second portion such that the second portion is undersized relative to the axial slot in a circumferential direction.

* * * * *